US011964470B2

(12) United States Patent
Saiga et al.

(10) Patent No.: US 11,964,470 B2
(45) Date of Patent: Apr. 23, 2024

(54) IMAGE FORMING APPARATUS FOR PRINTING A PLATE-SHAPED PRINTING MEDIUM

(71) Applicants: Soichi Saiga, Tokyo (JP); Atsushi Yanaka, Saitama (JP); Kiyoshi Tsukamura, Kanagawa (JP)

(72) Inventors: Soichi Saiga, Tokyo (JP); Atsushi Yanaka, Saitama (JP); Kiyoshi Tsukamura, Kanagawa (JP)

(73) Assignee: RICOH COMPANY LTD., Tokyo (JP)

( * ) Notice: Subject to any disclaimer, the term of this patent is extended or adjusted under 35 U.S.C. 154(b) by 121 days.

(21) Appl. No.: 17/696,109

(22) Filed: Mar. 16, 2022

(65) Prior Publication Data

US 2022/0314660 A1 Oct. 6, 2022

(30) Foreign Application Priority Data

Mar. 30, 2021 (JP) ................................ 2021-058757

(51) Int. Cl.
*B41J 11/06* (2006.01)
*B41J 3/407* (2006.01)
*B41J 13/00* (2006.01)
*B41J 13/10* (2006.01)
(Continued)

(52) U.S. Cl.
CPC ............... *B41J 11/06* (2013.01); *B41J 3/407* (2013.01); *B41J 13/0063* (2013.01); *B41J 13/106* (2013.01); *B65H 5/062* (2013.01); *B65H 5/36* (2013.01); *B65H 2402/10* (2013.01);
(Continued)

(58) Field of Classification Search
CPC ...... B41J 11/06; B41J 13/0063; B41J 13/106; B41J 3/407; B65H 2402/10; B65H 2402/40; B65H 2404/61; B65H 2801/21; B65H 5/062; B65H 5/36
See application file for complete search history.

(56) References Cited

U.S. PATENT DOCUMENTS

| | | | |
|---|---|---|---|
| 8,490,964 | B2 | 7/2013 | Kaiping |
| 2010/0231643 | A1 | 9/2010 | Saiga et al. |
| 2010/0295897 | A1 | 11/2010 | Naruse et al. |

(Continued)

FOREIGN PATENT DOCUMENTS

| | | | | |
|---|---|---|---|---|
| JP | 2005-067104 A | | 3/2005 | |
| JP | 2005067105 | * | 3/2005 | ............. B41J 13/00 |

(Continued)

OTHER PUBLICATIONS

Extended European Search Report dated Sep. 5, 2022, issued in corresponding European Patent Application No. 22162093.3.

*Primary Examiner* — Henok D Legesse
(74) *Attorney, Agent, or Firm* — Harness, Dickey & Pierce, P.L.C.

(57) ABSTRACT

An image forming apparatus includes a printing device, a rotator, an upstream support stand. The printing device prints an image on a plate-shaped printing medium. The rotator rotates while nipping the plate-shaped printing medium and conveys the plate-shaped printing medium to the printing device. The upstream support stand supports the plate-shaped printing medium at a position upstream from the rotator in a conveyance direction of the plate-shaped printing medium and includes a mount. The mount is detachably attached to the rotator.

20 Claims, 11 Drawing Sheets

(51) Int. Cl.
*B65H 5/06* (2006.01)
*B65H 5/36* (2006.01)

(52) U.S. Cl.
CPC ...... *B65H 2402/40* (2013.01); *B65H 2404/61* (2013.01); *B65H 2801/21* (2013.01)

(56) References Cited

U.S. PATENT DOCUMENTS

| | | | |
|---|---|---|---|
| 2011/0134187 | A1 | 6/2011 | Naruse et al. |
| 2011/0134190 | A1 | 6/2011 | Mase et al. |
| 2011/0141192 | A1 | 6/2011 | Komuro et al. |
| 2011/0199410 | A1 | 8/2011 | Mase et al. |
| 2011/0205299 | A1 | 8/2011 | Naruse et al. |
| 2011/0216113 | A1 | 9/2011 | Yorimoto et al. |
| 2012/0056936 | A1 | 3/2012 | Shimizu et al. |
| 2012/0062649 | A1 | 3/2012 | Naruse et al. |
| 2013/0034376 | A1 | 2/2013 | Saiga |
| 2014/0063123 | A1 | 3/2014 | Saiga et al. |
| 2016/0121634 | A1 | 5/2016 | Saiga et al. |
| 2016/0297212 | A1 | 10/2016 | Saiga et al. |
| 2018/0311983 | A1 | 11/2018 | Saiga |
| 2021/0001651 | A1 | 1/2021 | Saiga |

FOREIGN PATENT DOCUMENTS

| | | | |
|---|---|---|---|
| JP | 2008-201107 | A | 9/2008 |
| JP | 4199619 | B2 | 12/2008 |
| JP | 2011-083973 | | 4/2011 |
| JP | 2012-229064 | A | 11/2012 |
| JP | 2014-148055 | | 8/2014 |
| JP | 2020-121480 | | 8/2020 |
| WO | WO2010/103664 | A1 | 9/2010 |

* cited by examiner

IMAGE FORMING APPARATUS FOR PRINTING A PLATE-SHAPED PRINTING MEDIUM

CROSS-REFERENCE TO RELATED APPLICATION

This patent application is based on and claims priority pursuant to 35 U.S.C. § 119(a) to Japanese Patent Application No. 2021-058757, filed on Mar. 30, 2021, in the Japan Patent Office, the entire disclosure of which is hereby incorporated by reference herein.

BACKGROUND

Technical Field

Embodiments of this disclosure relate to an image forming apparatus.

Related Art

Typical image forming apparatuses may include a detachable auxiliary conveyance member to convey a plate-shaped printing medium such as a building material or a plastic plate which is a recording medium other than a sheet-shaped recording medium.

SUMMARY

In an embodiment of the present disclosure, there is provided an image forming apparatus that includes a printing device, a rotator, an upstream support stand. The printing device prints an image on a plate-shaped printing medium. The rotator rotates while nipping the plate-shaped printing medium and conveys the plate-shaped printing medium to the printing device. The upstream support stand supports the plate-shaped printing medium at a position upstream from the rotator in a conveyance direction of the plate-shaped printing medium and includes a mount. The mount is detachably attached to the rotator.

In another embodiment of the present disclosure, there is provided an image forming apparatus that includes a printing device, a rotator, an upstream support stand. The printing device prints an image on a plate-shaped printing medium. The rotator rotates while nipping the plate-shaped printing medium and conveys the plate-shaped printing medium to the printing device. The upstream support stand supports the plate-shaped printing medium at a position upstream from the rotator in a conveyance direction of the plate-shaped printing medium and includes a mount. The mount is detachably positioned in contact with the rotator.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
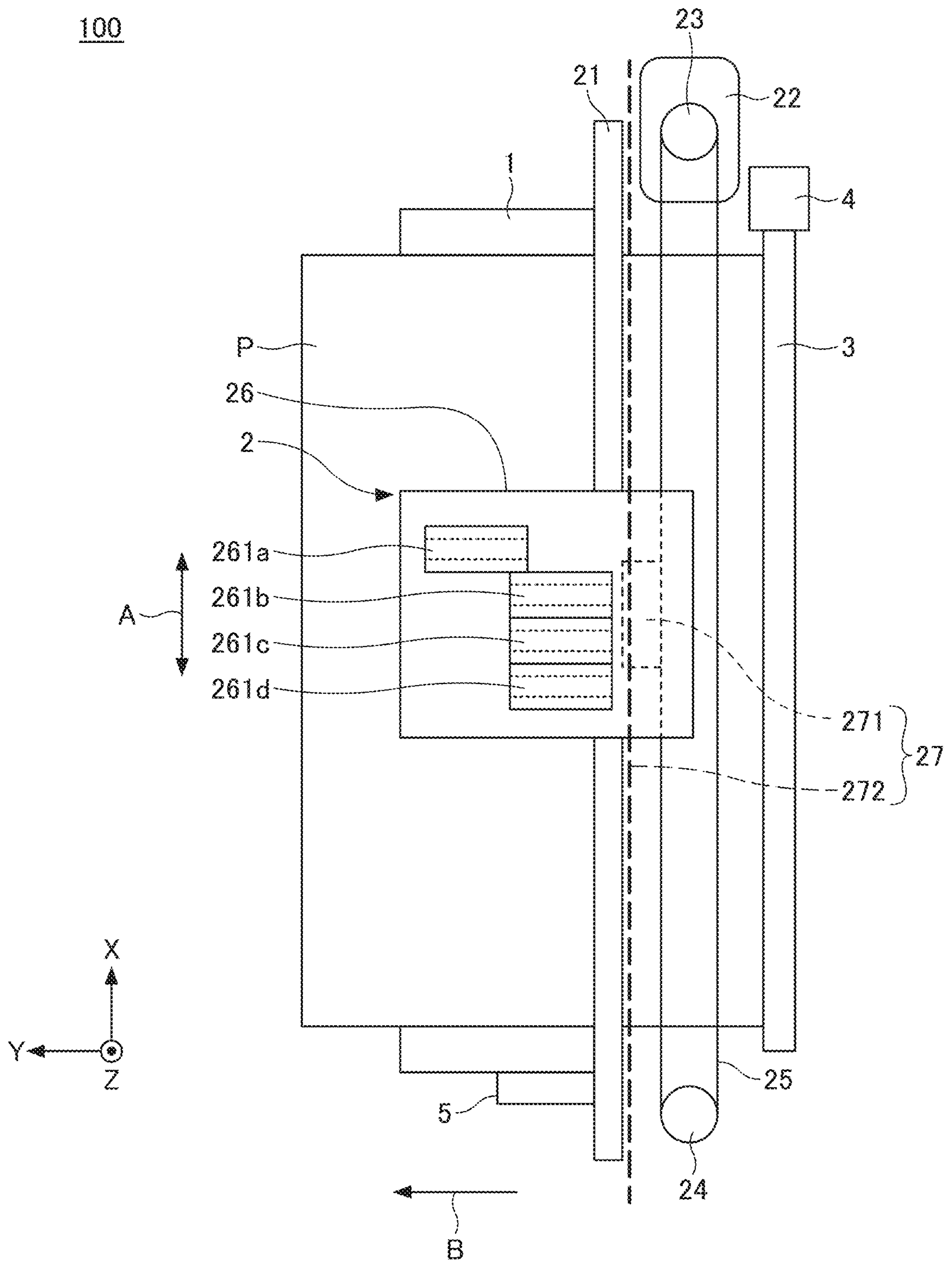
FIG. 1 is a diagram illustrating a vicinity of a printing unit of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to accompanying drawings. In the drawings, the same components are denoted by the same reference numerals, and redundant description is omitted as appropriate.

Further, the embodiments described below are some examples of an image forming apparatus for embodying the technical idea of the disclosure, and embodiments of the disclosure are not limited to the embodiments described below. For example, the dimension, material, and shape of components and the relative positions of the arranged components are given by way of example in the following description, and the scope of the present disclosure is not limited thereto unless particularly specified. The size, positional relation, and the like of components illustrated in the drawings may be exaggerated for clarity of description.

The image forming apparatus according to an embodiment includes a printing unit, a rotator, and an upstream support stand. The printing unit prints an image on a plate-shaped printing medium. The rotator rotates while nipping the plate-shaped printing medium and conveys the plate-shaped printing medium to the printing unit. The upstream support stand supports the plate-shaped printing medium upstream from the rotator in a conveyance direction.

The plate-shaped printing medium is a plate-shaped member such as a building material or a plastic plate and is a printing medium that is thicker and heavier than a sheet-shaped printing medium such as paper. Accordingly, the plate-shaped printing medium is conveyed in its original state without changing the shape of the medium. The term "building material" refers to a material for construction. For example, the building material is a wooden plate-shaped member used for a wall or a ceiling of a building. Further, the plastic plate refers to a plate-shaped member including a plastic material. For example, the plastic plate is a plate-shaped member serving as a base material of a signboard. In addition, tiles, crockery, campus boards, fusuma, doors, and the like may be used.

When the plate-shaped printing medium is conveyed, fluttering occurs unless a rear end of the printing medium is supported. As a result, the plate-shaped printing medium is not correctly conveyed, which leads to a conveyance problem. In a case where the conveyance problem occurs, an image may not be finally formed at a correct position, and thus image quality deteriorates.

In the present embodiment, when such a plate-shaped printing medium is conveyed to the printing unit, the upstream support stand supports the plate-shaped printing medium to prevent the conveyance problem.

In addition, in the present embodiment, the upstream support stand has a mount, the mount is detachably attached to the rotator. By attaching the mount to the rotator, the upstream support stand is positioned with respect to the rotator.

Such a configuration can prevent the upstream support stand from being attached in an inclined manner and support the plate-shaped printing medium at a correct position. As a result, a conveyance problem of the plate-shaped printing medium can be reduced.

The term "skew" refers to traveling obliquely. The term "obliquely" includes both a state where the plate-shaped printing medium is inclined in-plane and travels obliquely with respect to the conveyance direction and a state where the plate-shaped printing medium is inclined out-of-plane (in a flapping direction) and travels obliquely with respect to the conveyance direction.

Hereinafter, an embodiment is described as an example of a liquid-discharge-type image forming apparatus that forms an image by discharging liquid from a liquid discharge head onto a plate-shaped printing medium. Note that image formation, recording, and printing in the terms of the embodiments are synonymous.

The liquid is not limited to a particular liquid and may be any liquid having a viscosity or a surface tension to be discharged from a liquid discharge unit. However, preferably, the viscosity of the liquid is not greater than 30 mPa·s under ordinary temperature and ordinary pressure or by heating or cooling. Specific examples of the liquid include a solution, a suspension, or an emulsion containing, for example, a solvent such as water or an organic solvent, a colorant such as dye or pigment, a functional material such as a polymerizable compound, a resin, or a surfactant, a biocompatible material such as deoxyribonucleic acid (DNA), amino acid, protein, or calcium, and an edible material such as a natural colorant. The above-described examples may be used for inkjet inks, for example.

The liquid discharge head is a functional part that discharges and jets liquid from nozzles. Examples of an energy source for generating energy to discharge liquid include a piezoelectric actuator (a laminated piezoelectric element or a thin-film piezoelectric element), a thermal actuator that employs a thermoelectric conversion element such as a thermal resistor, and an electrostatic actuator including a diaphragm and opposed electrodes.

In the following description, directions may be indicated by an X axis, a Y axis, and a Z axis. An X direction along the X axis indicates a main scanning direction in which a carriage included in the image forming apparatus moves back and forth. A Y direction along the Y axis indicates a sub-scanning direction along the conveyance direction in which the plate-shaped printing medium is conveyed. A Z direction along the Z axis indicates a direction orthogonal to both the X axis and the Y axis.

A direction indicated by arrow along the X axis is referred to as a +X direction. A direction opposite the +X direction is referred to as a −X direction. A direction indicated by arrow along the Y axis is referred to as a +Y direction. A direction opposite the +Y direction is referred to as a −Y direction. A direction indicated by arrow along the Z axis is referred to as a +Z direction. A direction opposite the +Z direction is referred to as a −Z direction. The image forming apparatus conveys the plate-shaped medium in the +Y direction. However, the above-described directions do not limit the orientation of the image forming apparatus. The image forming apparatus may be disposed in any orientation.

First Embodiment

FIG. 1 is a diagram illustrating a configuration around a printing unit 2 in an image forming apparatus 100 according to an embodiment. As illustrated in FIG. 1, the image forming apparatus 100 includes a platen 1, the printing unit 2, a registration roller pair 3, a sub-scanning motor 4, and a maintenance-and-recovery mechanism 5.

The platen 1 is a medium supporter that supports a plate-shaped printing medium P. The platen 1 has a supporting face formed with high flatness and supports the plate-shaped printing medium P with the supporting surface. Thus, the platen 1 accurately maintains the positional relationship between the plate-shaped printing medium P and a carriage 26 disposed in the printing unit 2.

The printing unit 2 includes a guide rod 21, a main scanning motor 22, a drive pulley 23, a driven pulley 24, a timing belt 25, the carriage 26, and a linear encoder 27.

The printing unit 2 serving as a printing device prints an image above the platen 1 while the guide rod 21, the main scanning motor 22, the drive pulley 23, the driven pulley 24, and the timing belt 25 reciprocally move the carriage 26 along main scanning directions A.

The guide rod 21 is a guide hung between both side plates of the image forming apparatus 100 along the X axis together with a guide stay. The guide rod 21 supports the carriage 26 such that the carriage 26 moves in the main scanning directions A.

The main scanning motor 22 is a driving source for moving reciprocally the carriage 26 and is disposed proximate to the drive pulley 23 at an end of a timing belt 25 in the +X direction that is one of the main scanning directions A. The timing belt 25 is wound around the drive pulley 23 that is rotationally driven by the main scanning motor 22 and the driven pulley 24 that is disposed at an end of the timing belt 25 in the −X direction that is the other of the main scanning directions A. A belt holding portion of the carriage 26 is fixed to the timing belt 25. The main scanning motor 22 drives and reciprocally moves the carriage 26 along the main scanning directions A.

The carriage 26 includes four recording heads 261*a*, 261*b*, 261*c*, and 261*d* in which the liquid discharge head and a head tank for supplying liquid to the head are integrated. The number of recording heads is not limited to four and may be selected as appropriate for the use of the image forming apparatus 100.

Each of the four recording heads 261*a*, 261*b*, 261*c*, and 261*d* has a nozzle array in which a plurality of nozzles are arranged along a conveyance direction B. Each nozzle in the nozzle array discharges liquid toward the −Z direction. The recording head 261*a* is shifted from the recording heads 261*b*, 261*c*, and 261*d* by one nozzle array along the conveyance direction B.

Each of the recording heads 261*a*, 261*b*, 261*c*, and 261*d* has two nozzle arrays. Each of the recording heads 261*a* and 261*b* discharges liquid droplets of black from the two nozzle arrays. The recording head 261*c* discharges liquid droplets of cyan from one of the two nozzle arrays and does not use the other one of the two nozzle arrays. The recording head 261*d* discharges liquid droplets of yellow from one of the two nozzle arrays and discharges liquid droplets of magenta from the other one of the two nozzle arrays.

Accordingly, the image forming apparatus 100 prints a monochrome image having a width corresponding to a width of two recording heads by one movement in the main scanning direction A using the recording heads 261*a* and 261*b*. The image forming apparatus 100 prints a color image using, for example, the recording heads 261*b*, 261*c*, and 261*d*. The configuration of the recording head is not limited to the above-described configuration and may be selected as appropriate for the use of the image forming apparatus 100.

The linear encoder 27 includes an encoder sheet 271 and an encoder sensor 272. The encoder sheet 271 is disposed along the main scanning directions A. The encoder sensor 272 is disposed on the carriage 26 and reads the encoder sheet 271 while moving with the movement of the carriage 26. The image forming apparatus 100 can detect a position and speed of the carriage 26 from an output of the linear encoder 27.

The registration roller pair 3 serves as a pair of rotators that nips the plate-shaped printing medium P, according to the present embodiment. The sub-scanning motor 4 is an example of a medium conveying mechanism that drives and rotates the registration roller pair 3 to feed the plate-shaped printing medium P in the conveyance direction B and position the printing medium P on the platen 1.

The registration roller pair 3 feeds the plate-shaped printing medium P along the conveyance direction B by nipping the plate-shaped printing medium P between a pair of rollers and being rotated by the sub-scanning motor 4. The medium conveying mechanism may include a mechanism such as a gear, a belt, or a pulley in addition to the sub-scanning motor 4. At least one of the pair of two rollers included in the registration roller pair 3 is a drive roller. The roller other than the drive roller of the two rollers is a driven roller.

The maintenance-and-recovery mechanism 5 is proximate to a side of the platen 1 in the −X direction in the image forming apparatus 100. The maintenance-and-recovery mechanism 5 maintains and recovers the recording heads 261*a*, 261*b*, 261*c*, and 261*d*.

The plate-shaped printing medium P is fed by the registration roller pair 3 to a printing area in which printing on the plate-shaped printing medium P is performed in a main scanning movement area in which the carriage 26 is moved along the main scanning directions A. Thereafter, the plate-shaped printing medium P is intermittently conveyed B by the registration roller pair 3 in the conveyance direction.

Ink cartridges that function as main tanks replaceably attached to the image forming apparatus 100 supply respective color inks to the respective head tanks of the recording heads 261*a*, 261*b*, 261*c*, and 261*d* via respective supply tubes.

Figure 2A:
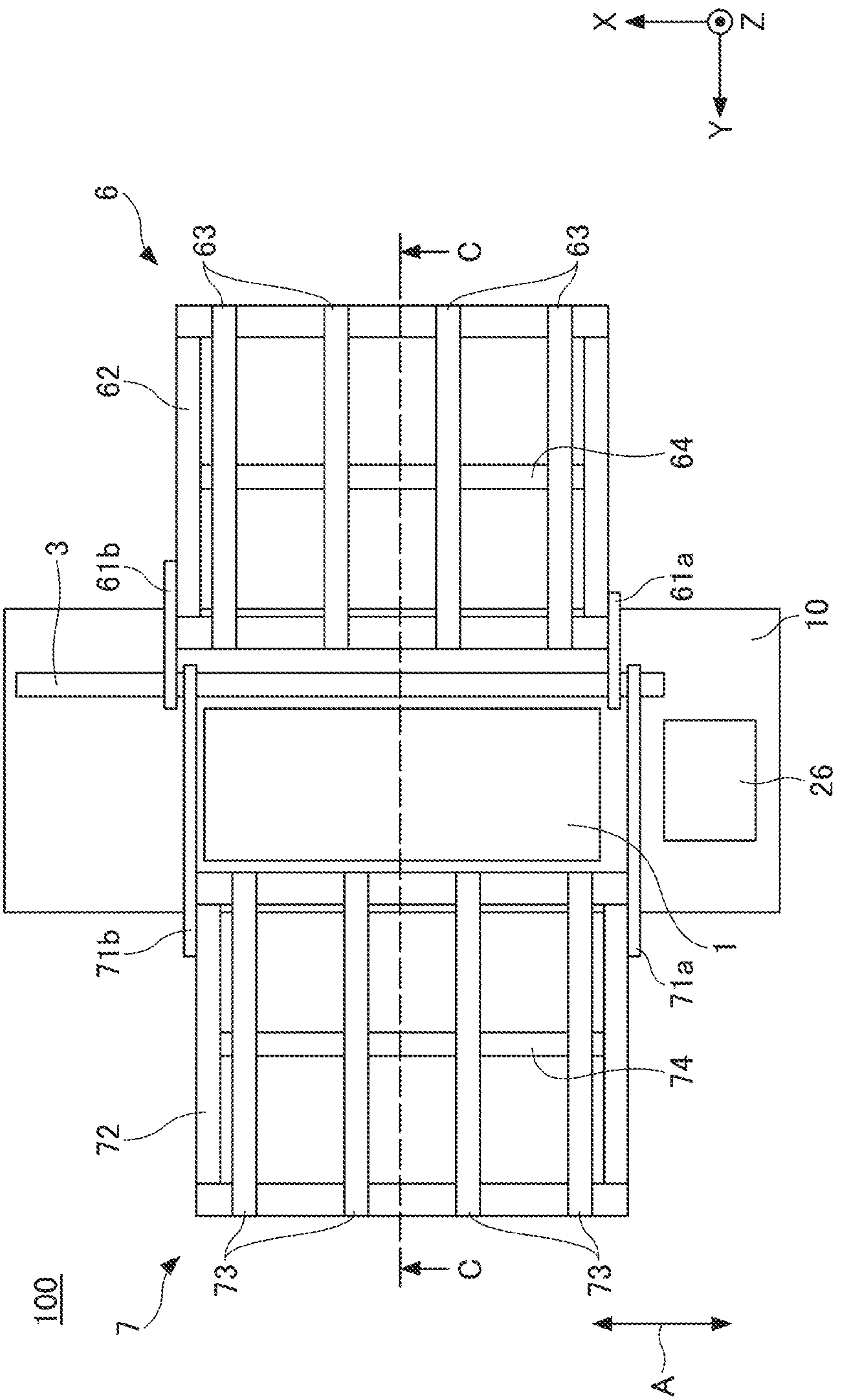
FIG. 2A is a top view of an upstream support stand and a downstream support stand according to a first embodiment of the present disclosure.
Figure 2B:
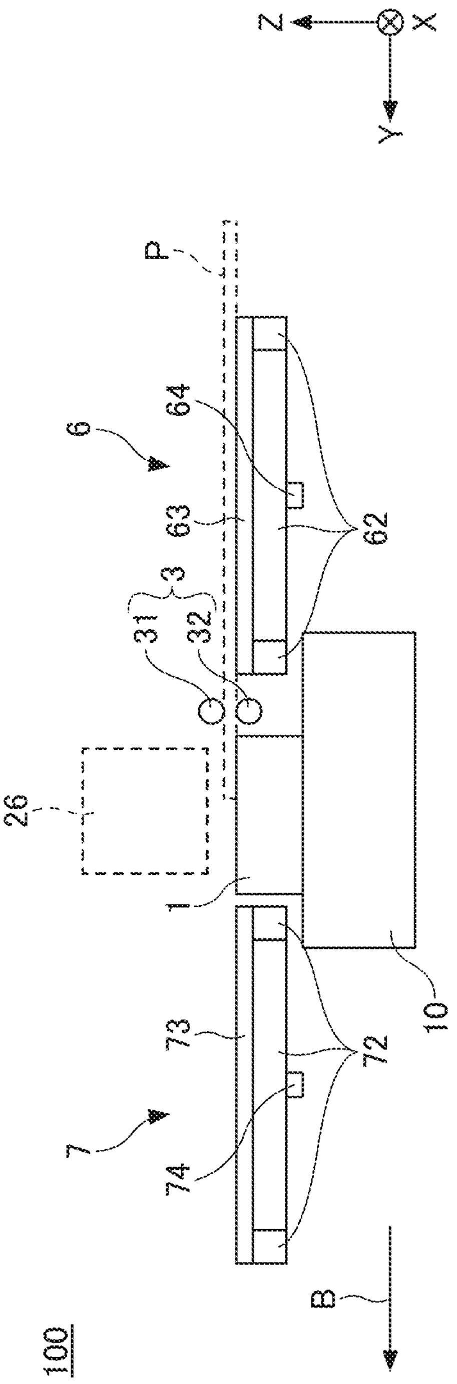
FIG. 2B is a cross-sectional view along a line C-C of FIG. 2A.

FIG. 2A is a top view of an upstream support stand 6 and a downstream support stand 7 in the image forming apparatus 100. FIG. 2B is a cross-sectional view of the upstream support stand 6 and the downstream support stand 7 along a line C-C of FIG. 2A. As illustrated in FIGS. 2A and 2B, the image forming apparatus 100 includes the upstream support stand 6, the downstream support stand 7, and a base portion 10. The base portion 10 is a component on which the platen 1 is placed.

As illustrated in FIG. 2B, the registration roller pair 3 includes an upper roller 31 serving as an upper rotator and a lower roller 32 serving as a lower rotator paired with each other. The registration roller pair 3 conveys the plate-shaped printing medium P along the conveyance direction B while nipping the plate-shaped printing medium P between the upper roller 31 and the lower roller 32.

The upstream support stand 6 supports an upstream side of the plate-shaped printing medium P in the conveyance direction when the plate-shaped printing medium P is fed by the registration roller pair 3. The upstream support stand 6 is disposed upstream from the platen 1 along the conveyance direction B and supports the plate-shaped printing medium P from below in the vertical direction (+Z direction).

As illustrated in FIG. 2A, the upstream support stand 6 includes upstream mounts 61*a* and 61*b*, an upstream outer frame 62, upstream supporters 63, and an upstream reinforcing member 64. Materials of the above-described components are not particularly limited. The components may include a material such as metal or resin, for example.

Each of the upstream mounts 61*a* and 61*b* is an example of a mount of the upstream support stand 6. The upstream mounts 61*a* and 61*b* are detachably attached to the registration roller pair 3, and abut against the registration roller pair 3 so that the upstream support stand 6 is positioned with respect to the registration roller pair 3.

Each of the upstream mounts 61*a* and 61*b* is a columnar member. The upstream mounts 61*a* and 61*b* are disposed on both sides of the platen 1 along the main scanning directions A. Each of the upstream mounts 61*a* and 61*b* abuts against the registration roller pair 3.

As the upstream mounts 61*a* and 61*b* abut against the registration roller pair 3, the upstream support stand 6 is attached to the registration roller pair 3 while being positioned with respect to the registration roller pair 3. By contrast, as the upstream mounts 61*a* and 61*b* are detached from the registration roller pair 3, the upstream support stand 6 is detached from the registration roller pair 3.

Note that, since the upstream mounts 61*a* and 61*b* have substantially the same configuration except for the positions where the upstream mounts 61*a* and 61*b* are disposed, the upstream mounts 61*a* and 61*b* may be collectively referred to as the upstream mount 61 or upstream mounts 61 below unless particularly distinguished.

The upstream outer frame 62 is a rectangular frame-shaped member in which four columnar members serving as respective sides of a rectangle are coupled by screws.

Each of the upstream supporters 63 is a beam that is suspended between the columnar members of the upstream outer frame 62 and extends along the conveyance direction B. Specifically, the upstream supporters 63 include four beams, which are suspended between the two columnar members extending along the main scanning directions A of the upstream outer frame 62.

Each of the four upstream supporters 63 contacts the plate-shaped printing medium P with a side surface in the +Z direction and supports the plate-shaped printing medium P from below in the +Z direction. The upstream supporters 63 also have a function of reinforcing the mechanical strength of the upstream support stand 6 by being suspended between the columnar members of the upstream outer frame 62.

The upstream reinforcing member 64 is a beam that is suspended between the columnar members of the upstream outer frame 62 and extends along the main scanning directions A. The upstream reinforcing member 64 includes one beam, which is suspended between the two columnar members extending along the conveyance direction B of the upstream outer frame 62.

The weight of the upstream support stand 6 is reduced as the upstream support stand 6 includes the upstream outer frame 62, which is a frame-shaped member. The upstream supporters 63 and the upstream reinforcing member 64 of the upstream support stand 6 reinforce the mechanical strength of the upstream outer frame 62 and prevents bending of the upstream support stand 6.

The downstream support stand 7 supports a downstream side of the plate-shaped printing medium P in the conveyance direction when the plate-shaped printing medium P is conveyed by the registration roller pair 3. The downstream support stand 7 is disposed downstream from the platen 1 along the conveyance direction B and supports the plate-shaped printing medium P from below in the +Z direction.

As illustrated in FIG. 2A, the downstream support stand 7 includes downstream mounts 71*a* and 71*b*, a downstream outer frame 72, downstream supporters 73, and a downstream reinforcing member 74. Materials of the above-described components are not particularly limited. The components may include a material such as metal or resin, for example.

Each of the downstream mounts 71*a* and 71*b* is an example of a mount of the downstream support stand 7. The downstream mounts 71*a* and 71*b* are detachably attached to the registration roller pair 3, and abut against the registration roller pair 3 so that the downstream support stand 7 is positioned with respect to the registration roller pair 3.

As the downstream mounts 71*a* and 71*b* abut against the registration roller pair 3, the downstream support stand 7 is attached to the registration roller pair 3 while being positioned with respect to the registration roller pair 3. By contrast, as the downstream mounts 71*a* and 71*b* are detached from the registration roller pair 3, the downstream support stand 7 is detached from the registration roller pair 3.

Each of the downstream mounts 71*a* and 71*b* is a columnar member. The downstream mounts 71*a* and 71*b* are disposed on both sides of the platen 1 along the main scanning directions A. Each of the downstream mounts 71*a* and 71*b* abuts against the registration roller pair 3.

The downstream mounts 71*a* and 71*b* are not necessarily limited to those attached to the registration roller pair 3. For example, separately from the registration roller pair 3 as a first roller, another roller as a second roller may be disposed downstream from the platen 1, and the downstream mounts 71*a* and 71*b* may be attached to the second roller. In this case, the downstream support stand 7 is positioned with respect to the second roller.

Note that, since the downstream mounts 71*a* and 71*b* have substantially the same configuration except for the positions where the downstream mounts 71*a* and 71*b* are disposed, the downstream mounts 71*a* and 71*b* may be collectively referred to as the downstream mount 71 or downstream mounts 71 below unless particularly distinguished.

The downstream outer frame 72 is a rectangular frame-shaped member in which four columnar members serving as respective sides of a rectangle are coupled by screws.

Each of the downstream supporters 73 is a beam that is suspended between the columnar members of the downstream outer frame 72 and extends along the conveyance direction B. Specifically, the downstream supporters 73 include four beams, which are suspended between the two columnar members extending along the main scanning directions A of the downstream outer frame 72.

Each of the four downstream supporters 73 contacts the plate-shaped printing medium P with a side surface in the +Z direction and supports the plate-shaped printing medium P from below in the +Z direction. The downstream supporters 73 also have a function of reinforcing the mechanical strength of the downstream support stand 7 by being suspended between the columnar members of the downstream outer frame 72.

The downstream reinforcing member 74 is a beam that is suspended between the columnar members of the downstream outer frame 72 and extends along the main scanning directions A. The downstream reinforcing member 74 includes one beam, which is suspended between the two columnar members extending along the conveyance direction B of the downstream outer frame 72.

The weight of the downstream support stand 7 is reduced as the downstream support stand 7 includes the downstream outer frame 72, which is a frame-shaped member. The downstream supporter 73 and the downstream reinforcing member 74 of the downstream support stand 7 reinforces the mechanical strength of the downstream outer frame 72 and prevents bending of the downstream support stand 7.

The configurations of the upstream support stand 6 and the downstream support stand 7 are not limited to the configurations illustrated in FIGS. 2A and 2B, and may be changed as appropriate for the size and weight of the plate-shaped printing medium P.

Figure 3:
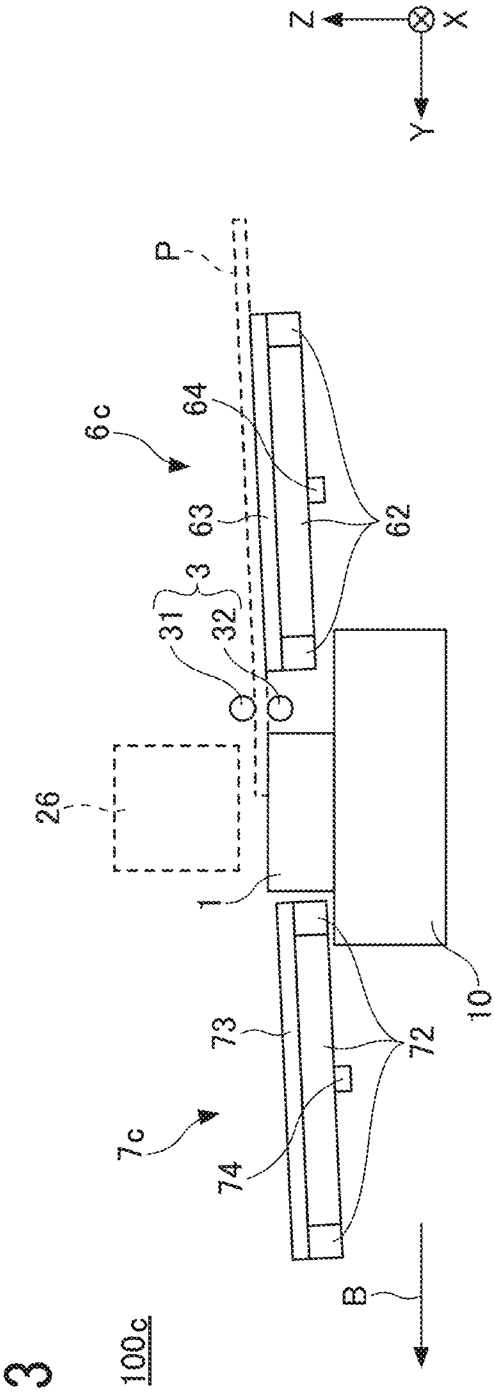
FIG. 3 is a view of an upstream support stand and a downstream support stand according to a first modification.

For example, inclining the upstream support stand 6 and the downstream support stand 7 prevents rattling during conveyance of the plate-shaped printing medium P. FIG. 3 is a cross-sectional view of an upstream support stand 6*c* and a downstream support stand 7*c* according to a first modification.

As illustrated in FIG. 3, in the vertical direction of an image forming apparatus 100*c*, an upstream side of the upstream support stand 6*c* in the conveyance direction is higher than a downstream side of the upstream support stand 6*c* in the conveyance direction. Further, in the vertical direction of an image forming apparatus 100*c*, a downstream side of the downstream support stand 7*c* in the conveyance direction is lower than an upstream side of the downstream support stand 7*c* in the conveyance direction. As described above, the upstream support stand 6 and the downstream support stand 7 may be inclined. However, only one of the upstream support stand 6*c* and the downstream support stand 7*c* may be inclined.

Figure 4A:
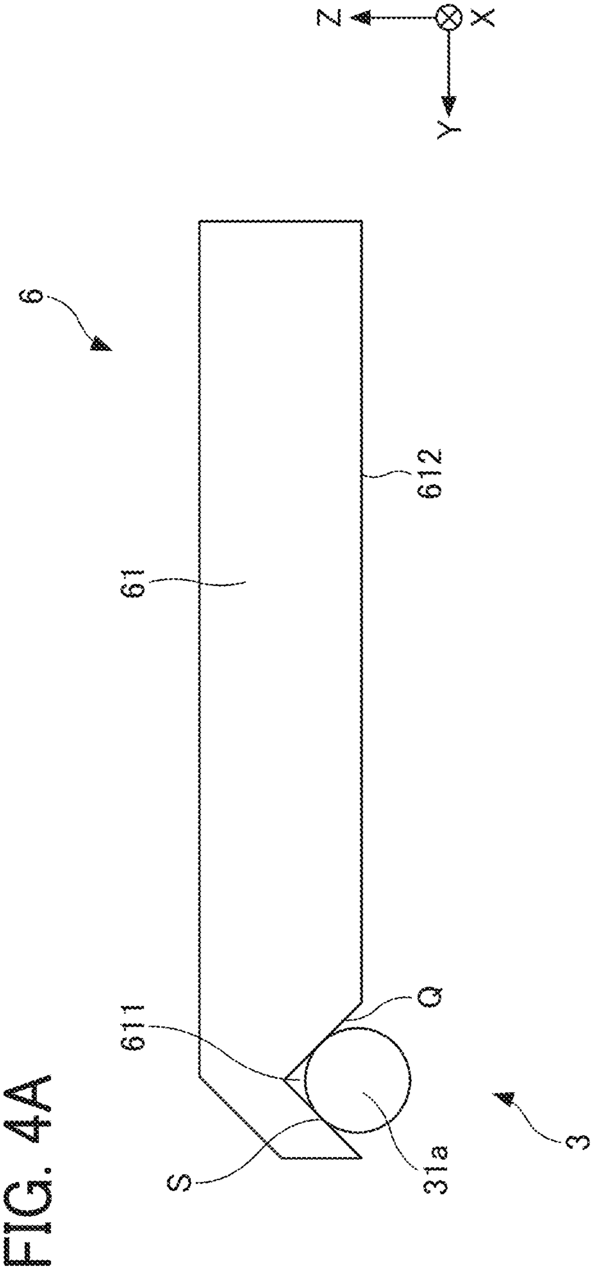
FIG. 4A is a view of an upstream mount attached to an upper roller.
Figure 4B:
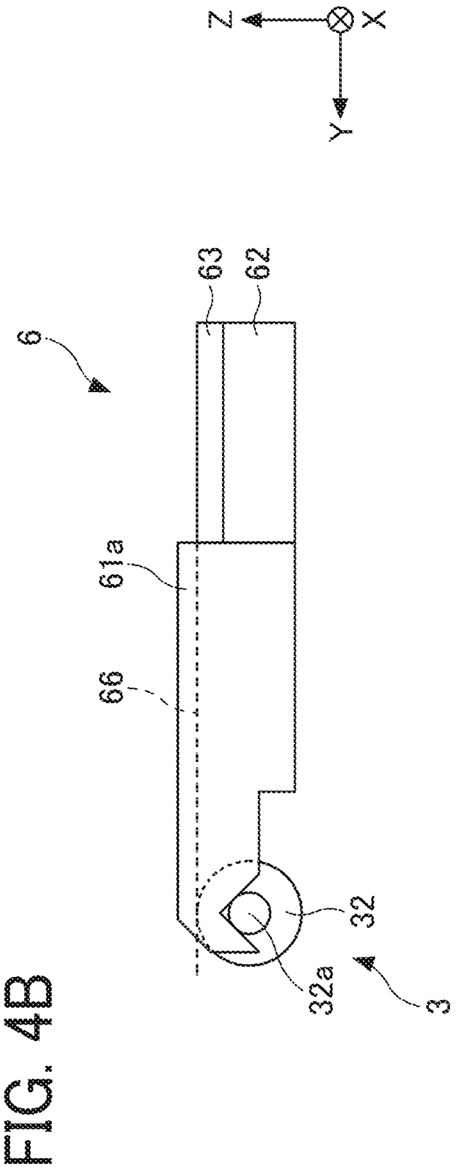
FIG. 4B is a view of the upstream mount attached to a lower roller.

FIG. 4A is a diagram illustrating a case where the upstream mount 61 is attached to the upper roller 31. FIG. 4B is a diagram illustrating a case where the upstream mount 61 is attached to the lower roller 32.

As illustrated in FIG. 4A, the upstream mount 61 has a recess 611 at one end thereof. The recess 611 is a recess having a substantially V-shaped cross section substantially orthogonal to an axial direction of the registration roller pair 3. Further, the recess 611 as a substantially V-shaped recess penetrates the upstream mount 61 along the axial direction of the registration roller pair 3.

Two surfaces S and Q included in the recess 611 contact a circumferential surface of a shaft 31*a* included in the upper roller 31 of the registration roller pair 3. Thus, the upstream support stand 6 is positioned with respect to the registration roller pair 3. That is, the registration roller pair 3 is paired, and the upstream mount 61 of the upstream support stand 6 is attached to the upper roller 31, which is disposed above the lower roller 32 in the vertical direction.

The shape of the recess 611 is not necessarily a substantially V-shaped cross-sectional shape, and may be, for example, a rectangular cross-sectional shape. From a viewpoint of positioning stability, the recess 611 preferably has a substantially V-shaped cross-sectional shape to stably abut against the circumferential surface of the shaft 31*a*.

A conveyance surface 66 illustrated in FIG. 4B indicates a surface on which the upstream mount 61 contacts the plate-shaped printing medium P when the plate-shaped printing medium P is conveyed. In the present embodiment, the conveyance surface 66 corresponds to a surface of the upstream supporter 63 in the +Z direction.

The upstream support stand 6 is attached to the lower roller 32 via the upstream mount 61 so that the height along the Z direction of the conveyance surface 66 easily matches the height along the Z direction of the circumferential surface of the lower roller 32 which the plate-shaped printing medium P contacts when the plate-shaped printing medium P is conveyed. That is, the registration roller pair 3 is paired, and the upstream mount 61 of the upstream support stand 6 is attached to the lower roller 32, which is disposed below the upper roller 31 in the vertical direction. As a result, the skew of the plate-shaped printing medium P is more suitably prevented when the plate-shaped printing medium P is conveyed.

Although the upstream support stand 6 is illustrated in FIG. 4B, the downstream support stand 7 is also attachable to the lower roller 32, and substantially the same effects as described above are obtained. That is, the downstream mount 71 of the downstream support stand 7 may be attached to the upper roller 31, which is disposed above the lower roller 32 in the vertical direction, or may be attached to the lower roller 32, which is disposed below the upper roller 31 in the vertical direction. In one embodiment, the upstream support stand 6 may be attached to the upper roller 31; whereas the downstream support stand 7 may be attached to the lower roller 32. Thus, the upstream support stand 6 and the downstream support stand 7 may be attached to different rollers.

Figure 5A:
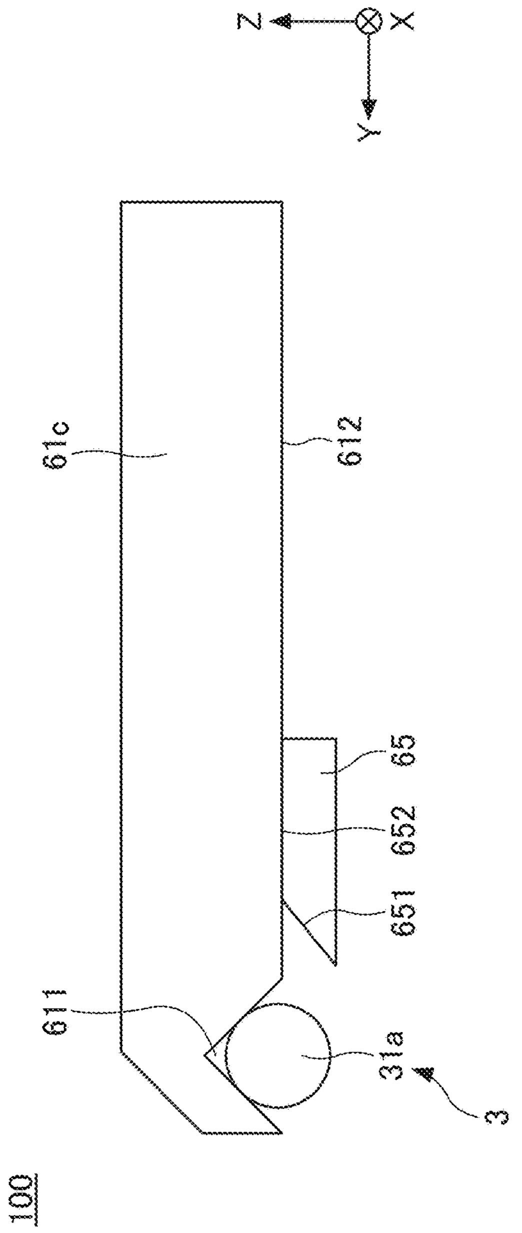
FIG. 5A is a view of an upstream mount before being locked according to a modification.
Figure 5B:
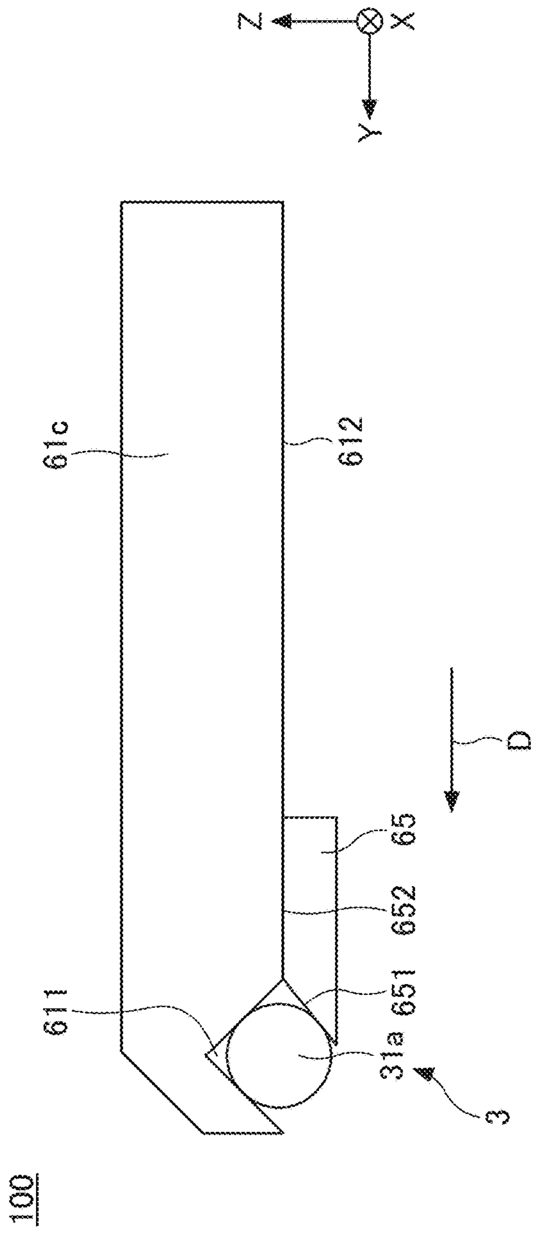
FIG. 5B is a view of the upstream mount locked according to the modification.

FIG. 5A is a diagram illustrating a configuration of an upstream mount 61*c* before being locked by an auxiliary member according to a modification. FIG. 5B is a diagram illustrating a configuration of the upstream mount 61*c* locked by the auxiliary member.

As illustrated in FIGS. 5A and 5B, the image forming apparatus 100 includes an auxiliary member 65. The auxiliary member 65 is disposed on a lower surface of the upstream mount 61*c* and is movable in the conveyance direction B. The auxiliary member 65 assists detachment of the upstream mount 61*c* from the shaft 31*a*.

The auxiliary member 65 includes a slope 651 and is disposed to be movable along a moving direction D. As illustrated in FIG. 5A, the auxiliary member 65 does not contact the shaft 31*a* before locking the upstream mount 61*c*. At the time of locking the upstream mount 61*c*, the auxiliary member 65 moves along the moving direction D until the slope 651 contacts the circumferential surface of the shaft 31*a*.

The recess 611 simply abutting against the shaft 31*a* may cause the shaft 31*a* and the upstream mount 61*c* to be detached from each other through an open side of the recess 611. Since the slope 651 of the auxiliary member 65 contacts the circumferential surface of the shaft 31*a*, detachment of the upstream mount 61*c* abutting against the shaft 31*a* from the shaft 31*a* is prevented.

When the upstream mount 61*c* is detached from the shaft 31*a*, the auxiliary member 65 is moved in a direction opposite the moving direction D. As a result, one side of the recess 611 is opened, and thus the upstream mount 61*c* is detached such that the shaft 31*a* passes through the open side of the recess 611.

In FIGS. 5A and 5B, the positioning of the upstream support stand 6 by the upstream mount 61*c* has been described. Substantially the same applies to the positioning of the downstream support stand 7, and therefore redundant description is omitted here.

Next, some effects of the image forming apparatus 100 are described.

Since the weight of a plate-shaped printing medium itself is larger than the weight of a sheet-shaped printing medium such as a sheet of paper, conveying resistance may increase and the plate-shaped printing medium may be skewed. To prevent the plate-shaped printing medium from skewing, there is known a configuration in which an auxiliary conveyance member such as an upstream support stand or a downstream support stand is detachably attached to an image forming apparatus.

However, in a case where the conveyance auxiliary member is attached so as to be inclined with respect to the conveyance direction, a force in an oblique direction is applied to a conveyor such as a registration roller pair, and thus the plate-shaped printing medium may be skewed.

Figure 6:
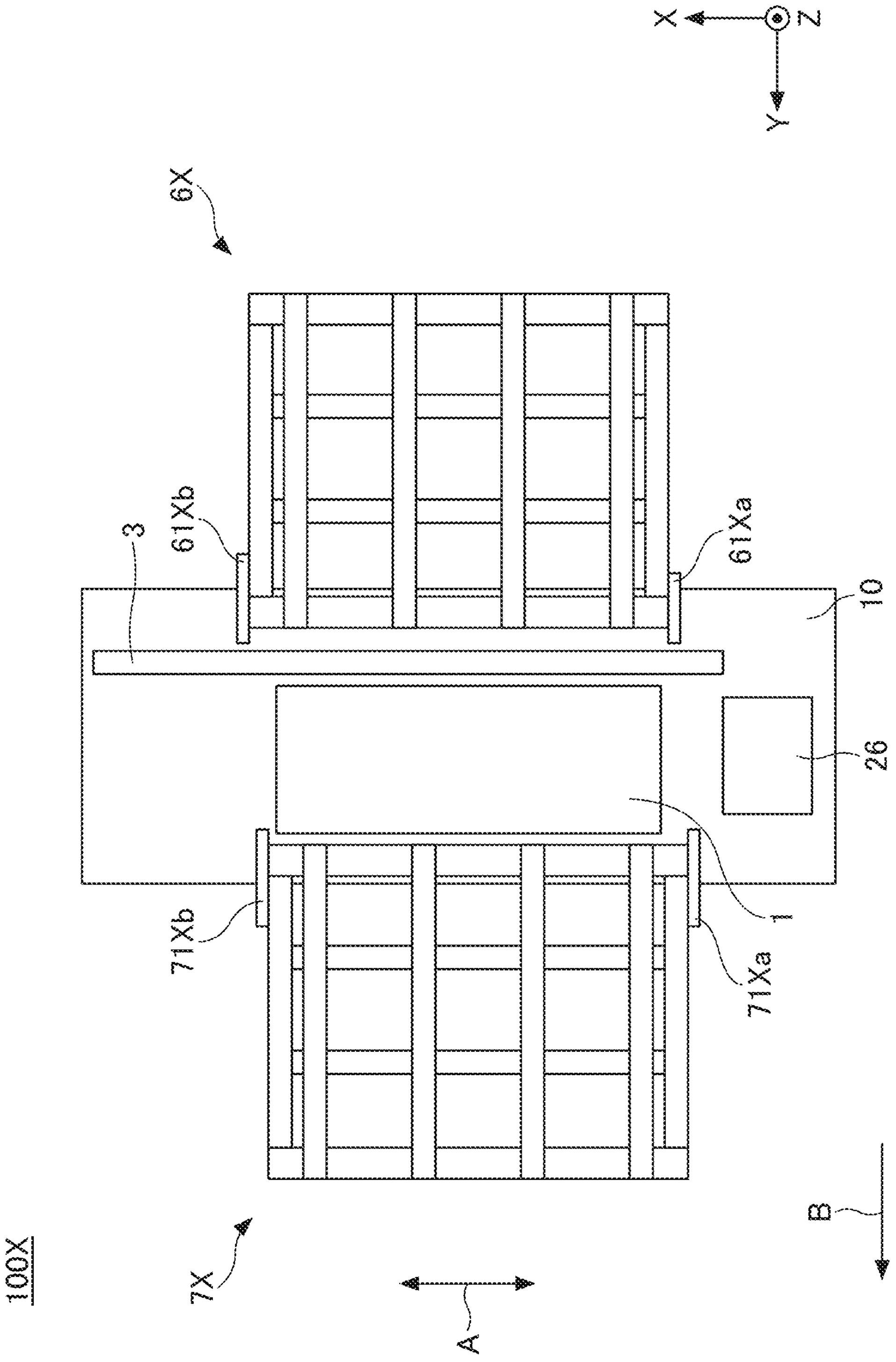
FIG. 6 is a diagram illustrating a configuration of an upstream support stand and a downstream support stand according to a comparative example.

FIG. 6 is a diagram illustrating a configuration of an image forming apparatus 100X according to a comparative example. Components having functions equivalent to those of the image forming apparatus 100 according to the present embodiment are denoted by the same reference numerals for the sake of convenience, and redundant description is omitted.

As illustrated in FIG. 6, the image forming apparatus 100X includes an upstream support stand 6X and a downstream support stand 7X. The upstream support stand 6X includes upstream mounts 61Xa and 61Xb (hereinafter, simply referred to as upstream mount 61X). The downstream support stand 7X includes downstream mounts 71Xa and 71Xb (hereinafter, simply referred to as downstream mount 71X).

The upstream mount 61X is attached to the base portion 10, and the downstream mount 71X is similarly attached to the base portion 10.

As described above, when the upstream mount 61X and the downstream mount 71X are attached to the base portion 10, dimensional errors and geometry errors of a plurality of components interposed between the base portion 10 and the registration roller pair 3 are accumulated. As a result, a positional deviation occurs between a surface on which each of the upstream mount 61X and the downstream mount 71X supports the plate-shaped printing medium P and a surface on which the registration roller pair 3 contacts the plate-shaped printing medium P. That is, the plate-shaped printing medium P is not supported at a correct position. When a force in an oblique direction is applied to the registration roller pair 3, the plate-shaped printing medium P may be skewed.

Note that the same applies to a case where the upstream mount 61X and the downstream mount 71X are attached to an exterior member of the image forming apparatus 100X. In such cases, the plate-shaped printing medium P may not be supported at a correct position and may be skewed.

As a result, the plate-shaped printing medium P is not conveyed correctly, leading to a conveyance problem. In a case where the conveyance problem occurs, it eventually prevents formation of an image at a correct position and leads to deterioration of an image quality.

In the present embodiment, the upstream support stand 6 has the upstream mount 61. The upstream mount 61 is detachably attached to the registration roller pair 3 (rotator).

Since the upstream support stand 6 is directly positioned with respect to the registration roller pair 3, a positional deviation between a surface on which the upstream mount 61 supports the plate-shaped printing medium P and a surface on which the registration roller pair 3 contacts the plate-shaped printing medium P can be reduced. Accordingly, a problem that the upstream support stand 6 is mounted in an inclined manner can be prevented and the plate-shaped printing medium can be supported at a correct position compared to a case where the upstream support stand is positioned with respect to a component other than the registration roller pair 3, such as the base portion 10 or an exterior member. As a result, conveyance problems can be prevented.

In the present embodiment, the image forming apparatus 100 includes an auxiliary member 65 that assists detachment of an upstream mount 61 from the shaft 31*a*. The slope 651 contacts the circumferential surface of the shaft 31*a* by the auxiliary member 65, to prevent a problem that the upstream mount 61 abutted against the registration roller pair 3 be detached from the registration roller pair 3. The same effect can be obtained in a case where the auxiliary member 65 is disposed on the downstream mount 71.

Modification

Figure 7:
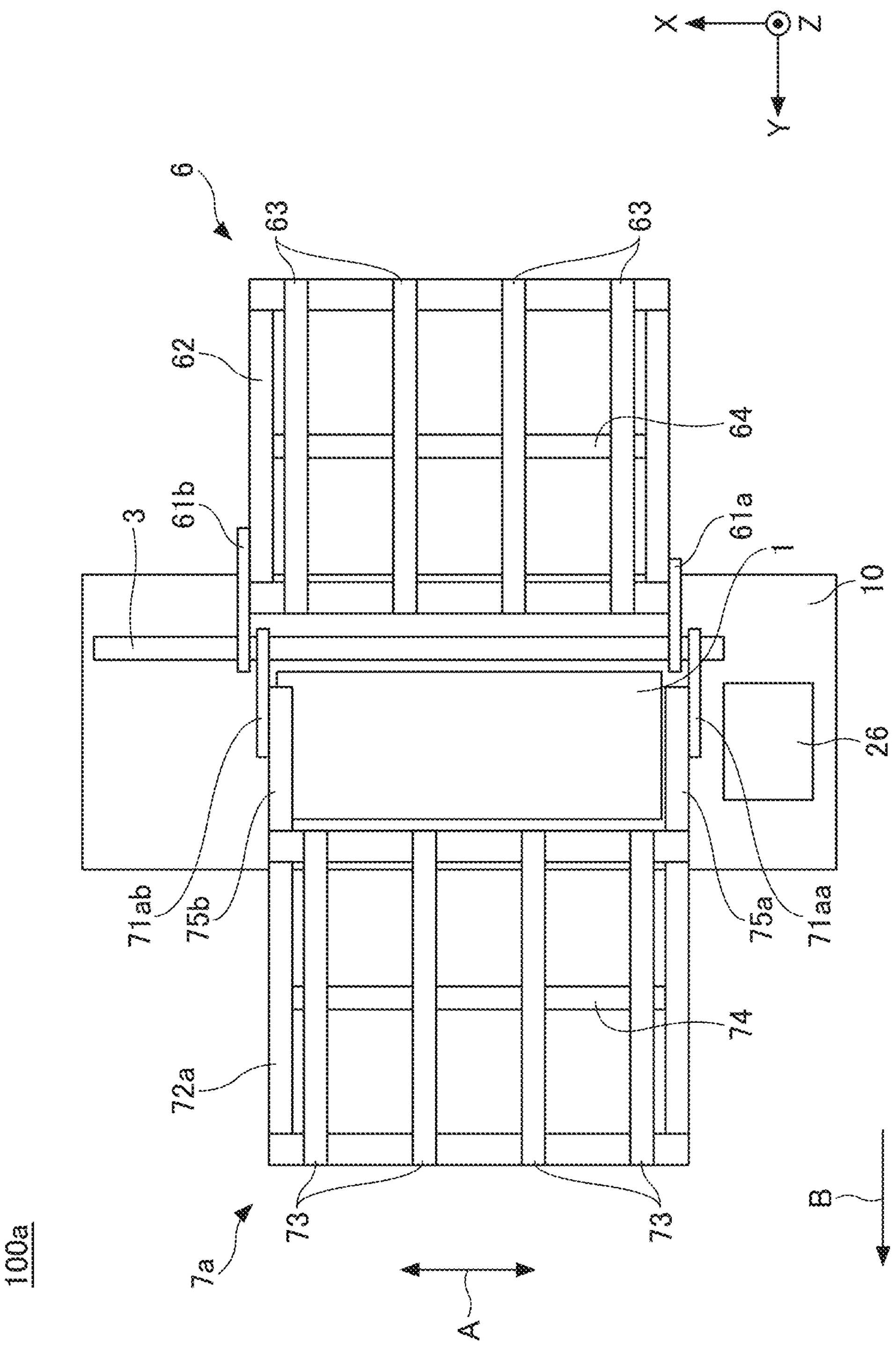
FIG. 7 is a view of an upstream support stand and a downstream support stand according to a second modification.

FIG. 7 is a diagram illustrating a configuration of an upstream support stand 6 and a downstream support stand 7*a* disposed in an image forming apparatus 100*a* according to a modification. As illustrated in FIG. 7, the downstream support stand 7*a* includes a downstream outer frame 72*a*, a downstream mount 71*aa*, and a downstream mount 7 lab.

The downstream outer frame 72*a* is provided with extending portions 75*a* and 75*b* on the side facing the registration roller pair 3. The extending portions 75*a* and 75*b* are portions of columnar members parallel to the conveyance direction B, among the four columnar members included in the downstream outer frame 72*a*, that extend toward the side facing the registration roller pair 3. The extending portions 75*a* and 75*b* are provided with the downstream mount 71*a* and 71*b*, respectively, at leading ends facing the registration roller pair 3.

In the image forming apparatus 100 according to the first embodiment, the downstream mount 71 is longer than the upstream mount 61 in the conveyance direction B to attach the downstream support stand 7 to the registration roller pair 3.

In contrast, in the present modification, the downstream outer frame 72*a* includes the extending portions 75*a* and 75*b*, and thus the length of each of the downstream mount 71*aa* and 7 lab along the conveyance direction B is substantially equal to the length of the upstream mount 61. With such a configuration described above, advantageous effects similar to those of the first embodiment of the present disclosure as described above can be achieved.

In addition, the rigidity of the extending portions 75*a* and 75*b* is higher than the rigidity of the downstream mounts 71*aa* and 71*ab* so that the downstream support stand 7*a* can be attached more stably to the registration roller pair 3.

Figure 8:
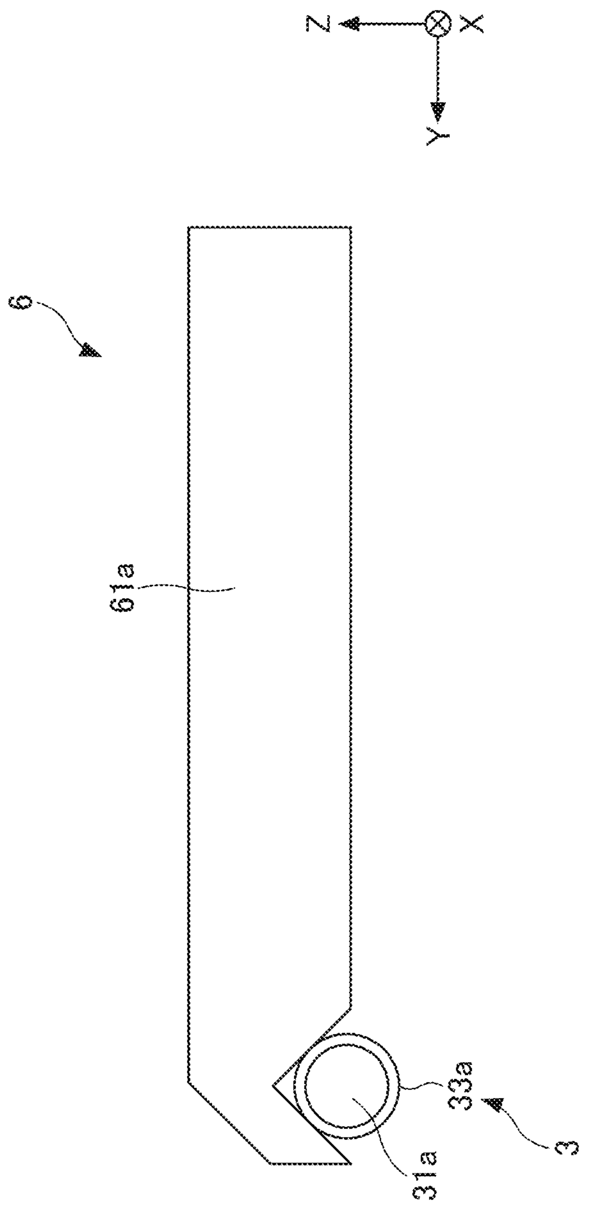
FIG. 8 is a diagram illustrating a configuration in which the upstream mount is attached via a bearing.

FIG. 8 is a diagram illustrating a configuration in which the upstream mount is attached to the registration roller pair 3 via a bearing. As illustrated in FIG. 8, a bearing 33*a* is disposed on the shaft 31*a* of the upper roller 31 included in the registration roller pair 3.

The bearing 33*a* is disposed in contact with an outer circumferential surface of the shaft 31*a* such that the shaft 31*a* is rotatable. The bearing 33*a* includes a bearing member such as a ball or a needle inside and contacts the outer circumferential surface of the shaft 31*a* via the bearing member. Thus, sliding friction generated by rotation of the shaft 31*a* is reduced, and the shaft 31*a* can smoothly rotate. The upstream mount 61*a* of the upstream support stand 6 is attached to the bearing 33*a*. Note that the length (width) of the bearing 33*a* along the shaft 31*a* may span at least an area in which the upstream mount 61*a* contacts the shaft 31*a*.

In the modification illustrated in FIG. 8, the upstream mount 61 is attached to the registration roller pair 3 via the bearing 33*a* without direct contact between the upstream mount 61 and the registration roller pair 3. As a result, when the registration roller pair 3 rotates, the registration roller pair 3 smoothly rotates, and wear of the registration roller pair 3 can be reduced.

Note that, if the sliding friction generated by rotation of the shaft 31*a* can be reduced, the upstream mount 61 may be attached to the registration roller pair 3 via a member other than the bearing 33*a*. Such a member other than the bearing 33*a* is a rotating collar member, for example.

Similarly with the upstream mount 61*a* illustrated in FIG. 8, the upstream mount 61*b* can be attached to the registration roller pair 3 via the bearing 33*a*. Similarly, the downstream support stand 7 can be attached to the registration roller pair 3 via the bearing 33*a*. In either case, substantially the same effects as described above can be obtained.

Figure 9:
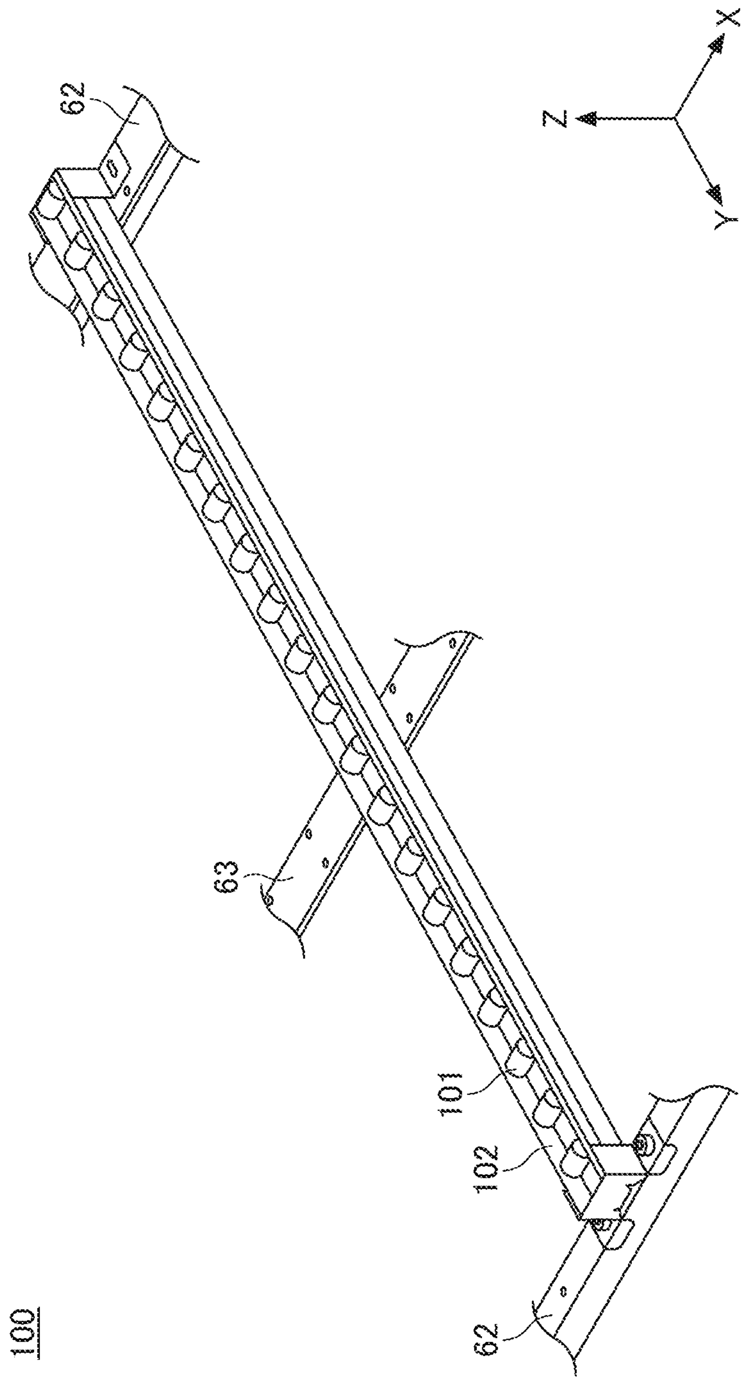
FIG. 9 is a view of a part of the upstream support stand provided with rollers.

FIG. 9 is a view of a part of the upstream support stand 6 provided with rollers 101. As illustrated in FIG. 9, the upstream support stand 6 provided with the rollers 101 arranged side by side in the conveyance direction and the image forming apparatus main body provided with the registration roller pair 3 are positioned, thus allowing a conveyance direction of the plate-shaped printing medium by the rollers 101 to match a conveyance direction of the plate-shaped printing medium by the registration roller pair 3. FIG. 9 illustrates a roller supporter 102, an upstream outer frame 62, and an upstream supporter 63.

Second Embodiment

Next, an image forming apparatus 100*b* according to a second embodiment of the present disclosure is described. The same components as the components described in the first embodiment are denoted by the same reference numerals, and redundant description is omitted as appropriate.

Figure 10:
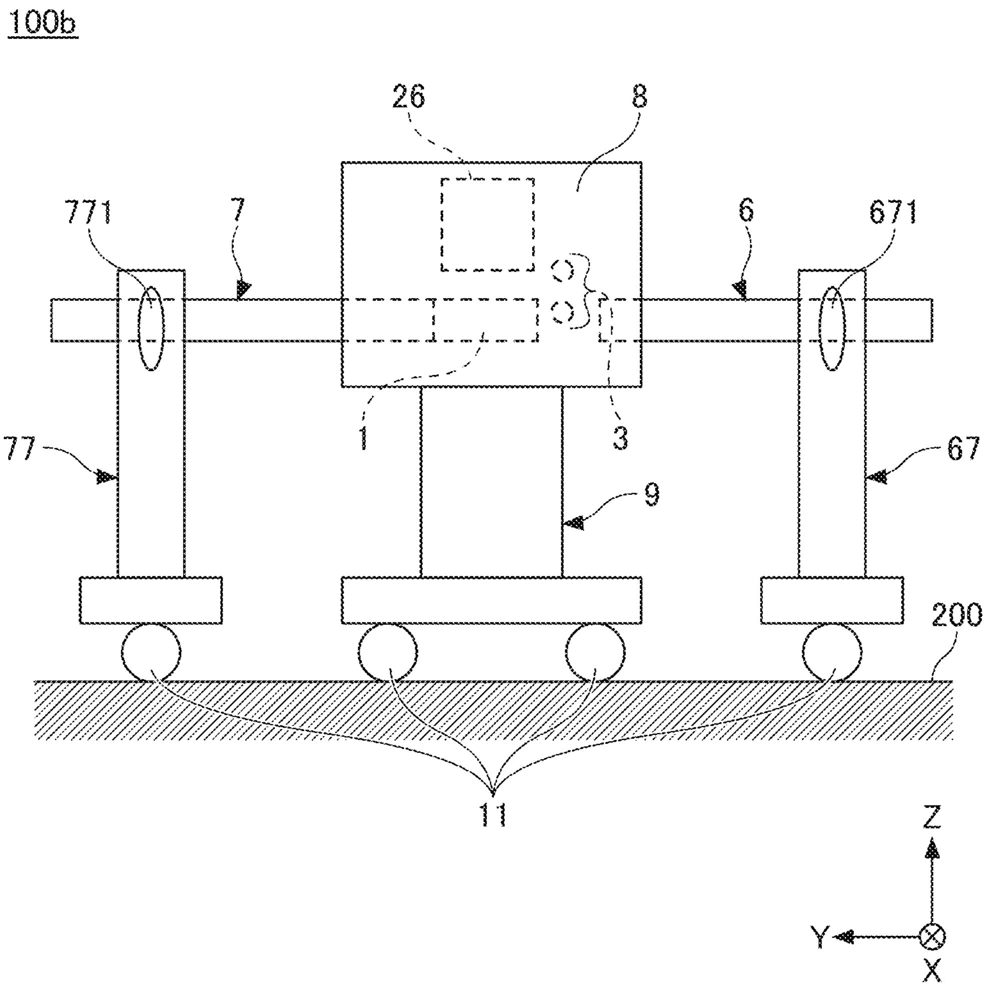
FIG. 10 is a view of an image forming apparatus according to a second embodiment.

FIG. 10 is a diagram illustrating a configuration of the image forming apparatus 100*b*. As illustrated in FIG. 10, the image forming apparatus 100*b* includes an exterior member 8, a main body support 9, an upstream support 67, and a downstream support 77.

The exterior member 8 functions as an exterior that covers the platen 1, the registration roller pair 3, and the carriage 26. The exterior member 8 may cover at least the registration roller pair 3.

The main body support 9 is a member that supports the platen 1, the registration roller pair 3, the exterior member 8, and the carriage 26. The upstream support 67 is an example of a support that supports the upstream support stand 6. The downstream support 77 is a member that supports the downstream support stand 7.

Casters 11 are disposed on the bottom portions of the main body support 9, the upstream support 67, and the downstream support 77 so as to be movable on a floor 200.

The upstream support 67 is provided with an upstream-support-stand mounting elongated hole 671. A vicinity of the end portion opposite the registration roller pair 3 of the upstream support stand 6 is fixed to the upstream support 67 such that a fastening screw is penetrated through the upstream-support-stand mounting elongated hole 671. The upstream support 67 can support the upstream support stand 6 such that the upstream support stand 6 is movable along the vertical direction which is a direction along the Z axis.

Similarly, the downstream support 77 is provided with a downstream-support-stand mounting elongated hole 771. A vicinity of the end portion opposite the registration roller pair 3 of the downstream support stand 7 is fixed to the downstream support 77 such that a fastening screw is penetrated through the downstream-support-stand mounting elongated hole 771. The downstream support 77 can support the downstream support stand 7 such that the downstream support stand 7 is movable along the vertical direction which is a direction along the Z axis.

The vicinity of the end portion opposite the registration roller pair 3 of the upstream support stand 6 can be moved along the vertical direction to adjust an inclination of the upstream support stand 6 in a flapping direction. Such a configuration can prevent the upstream support stand 6 from being attached in an inclined manner and more suitably prevent the plate-shaped printing medium P from skewing when the plate-shaped printing medium P is conveyed.

The vicinity of the end portion opposite the registration roller pair 3 of the downstream support stand 7 can also be moved along the vertical direction to adjust an inclination of the downstream support stand 7 in a flapping direction. Such a configuration can prevent the downstream support stand 7 from being attached in an inclined manner and more suitably prevent the plate-shaped printing medium P from skewing when the plate-shaped printing medium P is conveyed.

Figure 11:
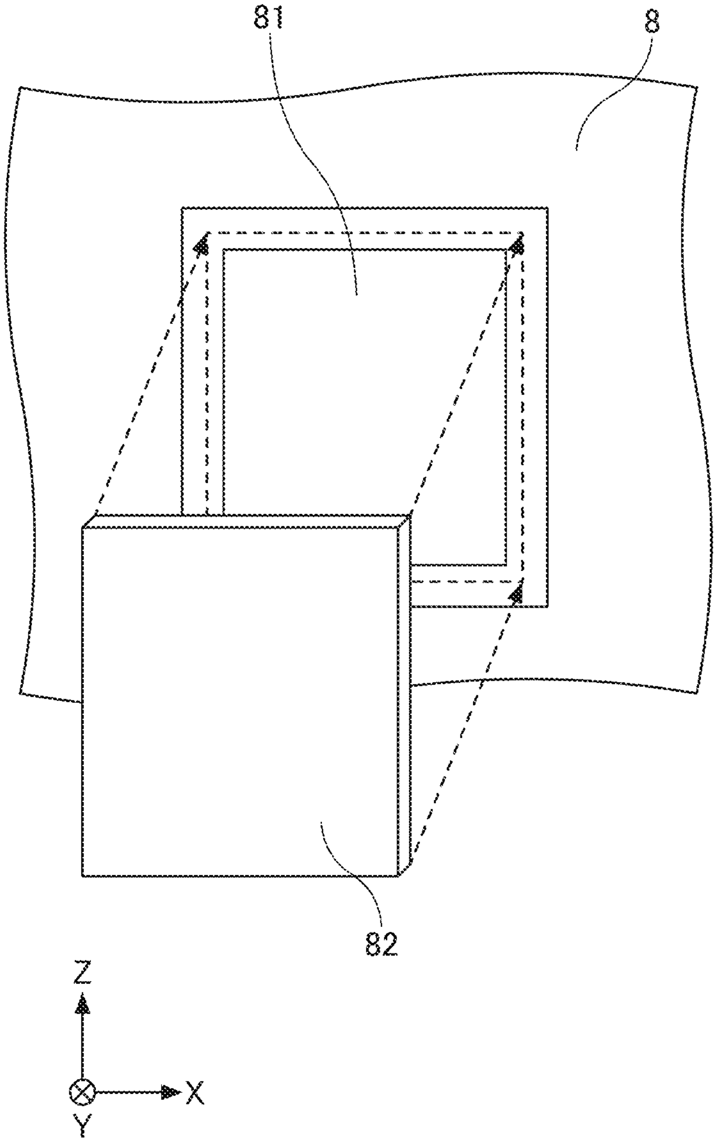
FIG. 11 is a view of an insertion hole provided in an exterior member.

FIG. 11 is a view of an insertion hole 81 in the exterior member 8. The insertion hole 81 is a hole into which the upstream mount 61 and the downstream mount 71 are inserted from the outside of the exterior member 8. The exterior member 8 has the two insertion holes 81 into which the upstream mounts 61*a* and 61*b* are inserted and has the two insertion holes 81 into which the downstream mounts 71*a* and 71*b* are inserted. The multiple insertion holes 81 may collectively be referred to as the insertion hole 81 below.

The respective end portions of the upstream mount 61 and the downstream mount 71 are inserted into the exterior member 8 through the insertion holes 81. Thus, the upstream mount 61 and the downstream mount 71 are attached to the registration roller pair 3.

The insertion hole 81 regulates movement of the upstream mount 61 and the downstream mount 71 inserted into the insertion hole 81 in the Z direction or the X direction, so that the upstream mount 61 and the downstream mount 71 are stably attached to the registration roller pair 3.

As illustrated in FIG. 11, the insertion hole 81 can be closed by attaching a closing member 82. In other words, the closing member 82 functions as a cover that closes the insertion hole 81.

In a case where the upstream support stand 6 or the downstream support stand 7 is not attached, the insertion hole 81 is open. Then, dust or the like may enter the inside of the exterior member 8 and adhere to the platen 1, so that the quality of image formation may deteriorate. In the state in which the insertion hole 81 is open, the appearance of the image forming apparatus 100 may be also impaired.

The insertion hole 81 can be closed by the closing member 82, thus preventing dust or the like from entering the exterior member 8 and adhering to the platen 1 in a case where the upstream support stand 6 or the downstream support stand 7 is not attached. Such a configuration can also prevent the appearance of the image forming apparatus 100 from being impaired.

Although some embodiments have been described above, embodiments of the present invention are not limited to the above-described embodiments specifically disclosed, and various modifications and variations can be made without departing from the scope of the claims.

Such variations are not to be regarded as a departure from the scope of the present disclosure and appended claims, and all such modifications are intended to be included within the scope of the present disclosure and appended claims.

The numbers such as ordinal numbers and numerical values that indicates quantity are all given by way of example to describe the technologies to implement the embodiments of the present disclosure, and no limitation is indicated to the numbers given in the above description.

The invention claimed is:

1. An image forming apparatus comprising:
- a printing device configured to print an image on a plate-shaped printing medium;
- a first rotator configured to rotate while nipping the plate-shaped printing medium and convey the plate-shaped printing medium to the printing device;
- an upstream support stand configured to support the plate-shaped printing medium at a position upstream from the first rotator in a conveyance direction of the plate-shaped printing medium, the upstream support stand including a detachable mount, the detachable mount configured to be attached to the first rotator; and
- an auxiliary member on a lower surface of the detachable mount, the auxiliary member configured to move in the conveyance direction.

2. The image forming apparatus according to claim 1, further comprising:
- a downstream support stand configured to support the plate-shaped printing medium at a position downstream from the first rotator in the conveyance direction,
- wherein the downstream support stand includes a detachable mount, the detachable mount configured to be attached to the first rotator.

3. The image forming apparatus according to claim 2,
- wherein a downstream side of the downstream support stand in the conveyance direction is lower in a vertical direction than an upstream side of the downstream support stand in the conveyance direction.

4. The image forming apparatus according to claim 2, further comprising:

a second rotator paired with the first rotator, wherein the detachable mount of the downstream support stand is further configured to attach to an upper one of the first rotator or the second rotator in the vertical direction.

5. The image forming apparatus according to claim 2, further comprising:

a second rotator paired with the first rotator, wherein the detachable mount of the downstream support stand in further configured to attach to a lower one of the first rotator or the second rotator in the vertical direction.

6. The image forming apparatus according to claim 1, wherein an upstream side of the upstream support stand in the conveyance direction is higher in a vertical direction than a downstream side of the upstream support stand in the conveyance direction.

7. The image forming apparatus according to claim 1, further comprising:

a second rotator paired with the first rotator, wherein the detachable mount of the upstream support stand is further configured to attach to an upper one of the first rotator or the second rotator in the vertical direction.

8. The image forming apparatus according to claim 1, further comprising:

a second rotator paired with the first rotator, wherein the detachable mount of the upstream support stand is further configured to attach to a lower one of the first rotator or the second rotator in the vertical direction.

9. The image forming apparatus according to claim 1, further comprising, a bearing, wherein the detachable mount is attached to the first rotator via the bearing.

10. The image forming apparatus according to claim 1, further comprising:

a support configured to support the upstream support stand such that the upstream support stand is configured to move in the vertical direction.

11. The image forming apparatus according to claim 1, further comprising:

an exterior member configured to cover at least the first rotator, wherein the exterior member includes an insertion hole and a closing member, the closing member configured to close the insertion hole when the closing member is attached to the exterior member.

12. An image forming apparatus comprising:

a printing device configured to print an image on a plate-shaped printing medium;

a first rotator configured to rotate while nipping the plate-shaped printing medium and convey the plate-shaped printing medium to the printing device;

an upstream support stand configured to support the plate-shaped printing medium at a position upstream from the first rotator in a conveyance direction of the plate-shaped printing medium, the upstream support stand including a detachable mount, the detachable mount configured to be positioned in contact with the first rotator; and an auxiliary member on a lower surface of the detachable mount, the auxiliary member configured to move in the conveyance direction.

13. The image forming apparatus according to claim 12, further comprising:

a downstream support stand configured to support the plate-shaped printing medium at a position downstream from the first rotator in the conveyance direction, wherein the downstream support stand includes a detachable mount, the detachable mount configured to be attached to the first rotator.

14. The image forming apparatus according to claim 13, wherein a downstream side of the downstream support stand in the conveyance direction is lower in a vertical direction than an upstream side of the downstream support stand in the conveyance direction.

15. The image forming apparatus according to claim 12, wherein an upstream side of the upstream support stand in the conveyance direction is higher in a vertical direction than a downstream side of the upstream support stand in the conveyance direction.

16. The image forming apparatus according to claim 12, further comprising:

a second rotator paired with the first rotator, wherein the detachable mount of the upstream support stand is further configured to attach to an upper one of the first rotator or the second rotator in the vertical direction.

17. The image forming apparatus according to claim 12, further comprising:

a second rotator paired with the first rotator, wherein the detachable mount of the upstream support stand is further configured to attach to a lower one of the first rotator or the second rotator in the vertical direction.

18. The image forming apparatus according to claim 12, further comprising:

an auxiliary member on a lower surface of the detachable mount, wherein the auxiliary member is configured to move in the conveyance direction.

19. The image forming apparatus according to claim 12, further comprising:

a bearing, wherein the detachable mount is attached to the first rotator via the bearing.

20. The image forming apparatus according to claim 13, further comprising:

a support configured to support the upstream support stand such that the upstream support stand is configured to move in the vertical direction.

* * * * *